(12) United States Patent
Fogle-Weekley et al.

(10) Patent No.: US 10,104,549 B2
(45) Date of Patent: Oct. 16, 2018

(54) NETWORK PROVISIONING SYSTEM AND METHOD FOR COLLECTION OF ENDPOINTS

(71) Applicant: Mitsubishi Electric Corporation, Tokyo (JP)

(72) Inventors: Lebbeous Fogle-Weekley, Cypress, CA (US); Matthew Smithson, Cypress, CA (US)

(73) Assignee: Mitsubishi Electric Corporation, Tokyo (JP)

( * ) Notice: Subject to any disclaimer, the term of this patent is extended or adjusted under 35 U.S.C. 154(b) by 64 days.

(21) Appl. No.: 15/281,358

(22) Filed: Sep. 30, 2016

(65) Prior Publication Data
US 2018/0098218 A1    Apr. 5, 2018

(51) Int. Cl.
| | |
|---|---|
| *H04L 1/00* | (2006.01) |
| *H04W 12/08* | (2009.01) |
| *H04W 12/04* | (2009.01) |
| *H04W 88/02* | (2009.01) |
| *H04W 88/08* | (2009.01) |

(52) U.S. Cl.
CPC ........... *H04W 12/08* (2013.01); *H04W 12/04* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2008/0222711 A1* | 9/2008 | Michaelis | G07C 9/00039 726/7 |
| 2013/0238142 A1 | 9/2013 | Nichols et al. | |
| 2013/0261807 A1 | 10/2013 | Zywicki et al. | |
| 2013/0310988 A1 | 11/2013 | Sartain et al. | |
| 2015/0100167 A1 | 4/2015 | Sloo et al. | |
| 2015/0120922 A1* | 4/2015 | Vaswani | G01D 4/004 709/224 |
| 2015/0268670 A1 | 9/2015 | Nies et al. | |
| 2015/0372875 A1* | 12/2015 | Turon | H04W 76/10 370/254 |

(Continued)

FOREIGN PATENT DOCUMENTS

| | | |
|---|---|---|
| CN | 104581847 A | 4/2015 |
| EP | 2 928 116 A1 | 10/2015 |

*Primary Examiner* — Phirin Sam
(74) *Attorney, Agent, or Firm* — Posz Law Group, PLC

(57) ABSTRACT

A system and method for provisioning multiple devices including a commissioning device, one or more endpoints, and a server. The system and method includes the following. The commissioning device accepts user-input network credentials of a wireless network from a user. The commissioning device searches for one or more endpoints unconnected to the wireless network. The commissioning device then verifies the ownership of the one or more endpoints. In response to a positive verification, the commissioning device securely the network credentials to the one or more endpoints. After receiving the network credentials, the one or more endpoints verify the integrity and authenticity of the communication from the commissioning device. After the one or more endpoints verifies the communication, the one or more endpoints access the wireless network based on the securely transferred wireless credentials.

24 Claims, 14 Drawing Sheets

(56) References Cited

U.S. PATENT DOCUMENTS

| | | | |
|---|---|---|---|
| 2016/0014671 A1* | 1/2016 | Turon | H04W 76/10 |
| | | | 370/329 |
| 2016/0029290 A1* | 1/2016 | Turon | H04W 76/10 |
| | | | 370/312 |
| 2017/0126682 A1* | 5/2017 | Wong | H04L 63/10 |
| 2017/0273119 A1* | 9/2017 | Li | H04W 8/08 |
| 2017/0289796 A1* | 10/2017 | Raleigh | H04W 12/04 |
| 2017/0366343 A1* | 12/2017 | Wifvesson | H04L 9/0822 |
| 2018/0020442 A1* | 1/2018 | Nair | H04W 72/0406 |

* cited by examiner

NETWORK PROVISIONING SYSTEM AND METHOD FOR COLLECTION OF ENDPOINTS

TECHNICAL FIELD

The present invention relates generally to a provisioning system and method that connects a collection of endpoints to a wireless network. More particularly, the present disclosure relates to a provisioning system and method that securely connects a collection of wireless network endpoints to a wireless network using encryption keys.

BACKGROUND

Conventional approaches to connect electronic devices to a wireless network typically require extensive user interactions and/or costly user interfaces in order to connect an electronic device to a wireless network.

For example, some conventional devices include a user interface on the device in order to allow the user to manually input information to connect the device to a wireless network. However, user interfaces may be unsuitable for some electronic devices. Furthermore, it is costly to physically install a user interface on every electronic devices.

Other conventional approaches may include a remote user interface located on a separate device. However, this conventional approach typically requires a user to perform numerous manipulations of her device in order to properly configure, among other things, the remote user interface.

In addition, conventional approaches to connect electronic devices to a wireless network require a user (or a technical support team) to manually input numerous information in order to properly connect the device. However, the time required for these types of manipulations is significant. Furthermore, the time spent performing these actions are compounded when a user needs to connect many electronic devices to a wireless network. That is, a user must individually input parameters for each electronic device in order to connect each of the same devices to a wireless network.

Other conventional approaches require physical manipulation of the device itself in order to connect a device to a wireless network. This physical step is in addition to approaches that already require a user to manipulate a user interface on the electronic device. For example, some conventional approaches may require that a user to access components (for example, buttons on each device) or information on the device itself in order to connect the device to a wireless network. However, a user may be unable to physically access some electronic devices that require internet connectivity.

In addition, conventional approaches that do ultimately provide internet connectivity to a device may lack sufficient security measures in order to ensure that a user's information remains secure. For example, the wireless credentials of a user's home network could be accessible, which results in venerability from unauthorized users (for example, hackers). On the other side, the manufacture of the device may need to securely transfer information to a device while protecting, for example, the information of its users and the manufacture's network.

SUMMARY

A method for provisioning multiple devices, comprising: accepting, via a commissioning device, user-input network credentials of a wireless network; searching, via the commissioning device, for one or more endpoints unconnected to the wireless network; verifying, via the commissioning device, ownership of the one or more endpoints to a server; securely transmitting, via the commissioning device, a network-credential communication that includes the user-input wireless network credentials from the commissioning device to the one or more endpoints in response to an affirmative verification of ownership; verifying, via the one or more endpoints, the integrity and authenticity of the network-credential communication; and accessing, via the one or more endpoints, the wireless network based on the wireless network credentials in response to an affirmative verification of the network-credential communication.

The one or more endpoints may be respectively attached to one or more electronic devices unconnected to the wireless network.

The method may include prompting a user to input network credentials into the commissioning device.

The method may include inputting, by a user, the network credentials into the commissioning device.

The verifying of the ownership of the one or more endpoints to a server may also include sending, via the one or more endpoints, at least one pre-stored universally unique identifier from the one or more endpoints to the commissioning devices; determining whether the server includes the pre-stored universally unique identifier of the—one or more endpoints; and confirming the ownership of the one or more endpoints in response to an affirmative determination that the server includes the pre-stored universally unique identifier of the one or more endpoints.

The verifying of the ownership of the one or more endpoints to a server may also include determining whether the pre-stored universally unique identifier has been previously registered with the server; sending a randomized value from the commissioning device to the one or more endpoints via a personal area network in response to an affirmative determination that the pre-stored universally unique identifier is previously registered with the server; sending the randomized value from the commissioning device to the server in order to confirm the co-location of the one or more endpoints; determining whether the randomized value is associated with the universally unique identifier previously registered in the server; and confirming the co-location of the one or more endpoints and the commissioning device in response to an affirmative determination that the randomized value is associated with the universally unique identifier.

The securely transmitting of the network-credential communication may also include generating, via the server, one or more unique encryption keys based on both unique data of the one or more endpoints and a pre-shared master key included in the server; encrypting the network-credential communication based on a session key as encrypted network credentials; and transmitting, via the commissioning device, the encrypted network credentials to the one or more endpoints; recalculating, via the one or more endpoints, the session key; and decrypting, via the one or more endpoints, the encrypted network credentials received from the commissioning device.

The unique encryption key may be the session key in the securely transmitting of the network-credential communication.

The securely transmitting of the network-credential communication may also include deriving, via the server, a randomized session key based on the unique encryption key and randomized plaintext. The randomized session key may be the session key.

The verifying of the integrity of the network-credential communication may also include calculating a first checksum for one or more secret data payloads, which include the user-input wireless network credentials; combining the first checksum with the user-input wireless network credentials into the each of the one or more secret data payloads; transmitting each of the one or more secret data payloads in the network-credential communication to the one or more endpoints, respectively; independently calculating a second checksum via the one or more endpoints; comparing the second checksum to the first checksum of the one or more secret data payloads; confirming the integrity of the network-credential communication in response to an affirmative determination that the first checksum matches the second checksum; and granting access to the one or more secret data payloads in response to the integrity of the network-credential communication being confirmed.

The verifying of the integrity of the network-credential communication may also include creating, via a server, one or more unique encryption keys based on a universally unique identifier of each of the one or more endpoints and a pre-shared master key included in the server; creating a randomized session key based on the unique encryption key and randomized plain text; encrypting the user-input wireless network credentials using the randomized session key as encrypted wireless credentials; transferring the encrypted wireless credentials to the one or more endpoints attached to the one or more electronic devices unconnected to the wireless network; independently calculating, via the one or more endpoints, a session key different from the randomized session key; decrypting, via the one or more endpoints, the network-credential communication; and calculating, via the one or more endpoints, a checksum; comparing the checksum and the randomized plain text; confirming the integrity of the network-credential communication in response to the checksum matching the randomized plain text; and granting access to the wireless network credentials in response to the integrity of the network-credential communication being confirmed.

The creating of the one or more unique encryption key may also include combining, via the server, the universally unique identifier of the one or more endpoints and the pre-shared master key located on the server to create each of the one or more unique encryption keys.

The creating of the randomized session key, the encrypting of the user-input wireless network credentials, and the transferring of the encrypted wireless credentials to the one or more endpoints may occur via the server.

The creating of the randomized session key, encrypting of the user-input wireless network credentials, and the transferring of the encrypted wireless credentials to the one or more endpoints may occur via the commissioning device.

One or more endpoint devices may be without a user interface. The commissioning device may be a smart phone. The one or more electronic devices may be one or more split-type indoor units of an air conditioning apparatus. The one or more endpoint may be wireless-network adapters that connect the split-type indoor units to the wireless work.

The searching, via the commissioning device, for the at least one endpoint may occur over a wireless personal area network. The searching for the at least one endpoint may occur via a range-limited wireless communication.

The one or more endpoints may be a plurality of endpoints. The accepting of the network credentials into the commissioning device may occur only once for a plurality of endpoints.

The verifying of the integrity of the network-credential communication may confirm the authenticity of the network-credential communication.

A device provisioning system may include one or more endpoints and a commissioning device. The one or more endpoints may be unconnected to a wireless network, configured to verify the integrity and authenticity of a network-credential communication that includes user-input wireless-network credentials, and access the wireless network based on the wireless network credentials in response to an affirmative verification of the network-credential communication. The commissioning device may be configured to accept user-input network credentials of a wireless network, search, via a wireless personal area network, for the one or more endpoints respectively attached to one or more electronic devices unconnected to the wireless network, verify the ownership of the one or more endpoints to a server; and securely transmit, via the wireless personal area network, a network-credential communication that includes the user-input wireless network credentials to the one or more endpoints in response to an affirmative verification of ownership.

The commissioning device may also be configured to prompt a user to input network credentials into the commissioning device. The one or more end units may be attachable to one or more electronic devices that are unconnected to the wireless network and that require network credentials. The one or more end units may provide wireless connectivity to the one or more electronic devices. The one or more electronic devices may be one or more split-type indoor units of an air conditioning apparatus.

A method for provisioning multiple devices may include the following: verifying, via a commissioning device, a co-location of one or more endpoints and the commissioning device to a server, the co-location being a predetermined spatial proximity between the one or more endpoints and the commissioning device; generating, via the server, a unique encryption key based on universally unique identifiers of each of the one or more endpoints and a pre-shared master key included in the server; securely transmitting, via the commissioning device, a network-credential communication from the commissioning device to the one or more endpoints in response to an affirmative verification of the co-location between the one or more endpoints and the commissioning device, the network-credential communication includes a user-input wireless network credentials and is based on the unique encryption key; verifying, via the one or more endpoints, the integrity and authenticity of the network-credential communication; and accessing, via the one or more endpoints, the wireless network based on the wireless network credentials in response to an affirmative verification of the network-credential communication.

The verifying of the integrity of the network-credential communication may include calculating a first checksum for one or more secret data payloads, which include the user-input wireless network credentials; combining the first checksum with the wireless network credentials into the one or more secret data payloads; transmitting the secret data payloads in the network-credential communication to the one or more endpoints, respectively; independently calculating a second checksum via the one or more endpoints; comparing the second checksum to the first checksum of the decrypted secret data payload; confirming the integrity of the network-credential communication in response to an affirmative determination that the first checksum matches the second checksum; and granting access to the secret data payload in response to the integrity of the network-credential communication being confirmed.

The verifying of the integrity of the network-credential communication may confirm the authenticity of the network-credential communication.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention. These drawings are not necessarily drawn to scale.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Furthermore, elements having the same number represent the same element across the various figures, and throughout the disclosure. Their description is not always repeated for each embodiment, but may be inferred from previous descriptions. Elements that have the same number but have the addition of a letter designator indicate distinct embodiments of a more generic element.

Overview

Figure 1:
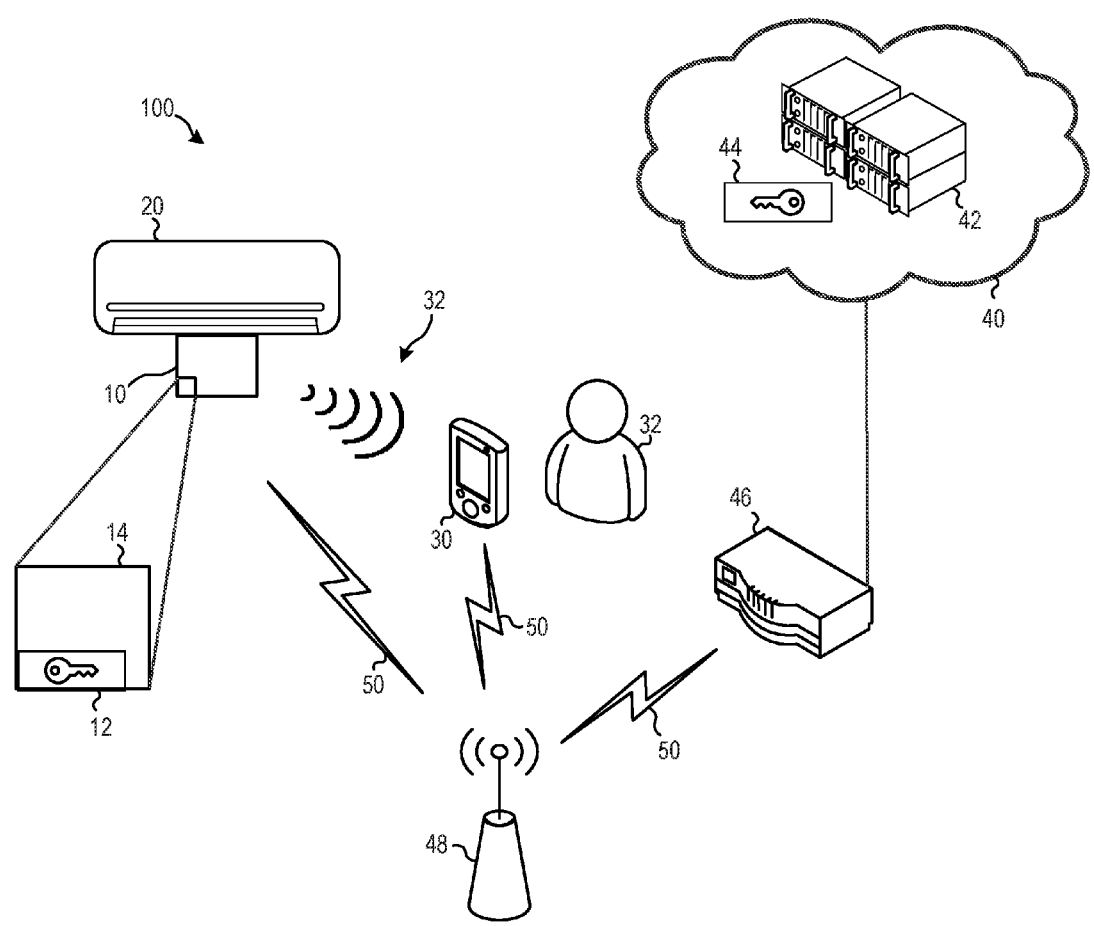
FIG. 1 shows a general overview of the provisioning system according to the disclosed embodiments.

The provisioning system and method of the present disclosure provides a secure manner to connect a collection of endpoints to a wireless network while minimizing user interactions. FIG. 1 shows a provisioning system 100 and the components of the provisioning system 100. Specifically, FIG. 1 shows an electronic device 20 physically connected to an endpoint 10 that provides wirelesses connectivity to the electronic device 20. FIG. 1 also shows a wireless access point 48 (for example, a router) that connects to a web service 40 located on a server 42 via an internet gateway 46. In order to connect the unconnected endpoint 10 to the wireless access point 48, the provisioning system 100 includes a commissioning device 30.

As discussed in greater detail below, the commissioning device 30 acts as a conduit to relay information between the endpoint 10 and the web service 40, and to connect the endpoint 10 to the local wireless network 50 ("wireless network").

Figure 2:
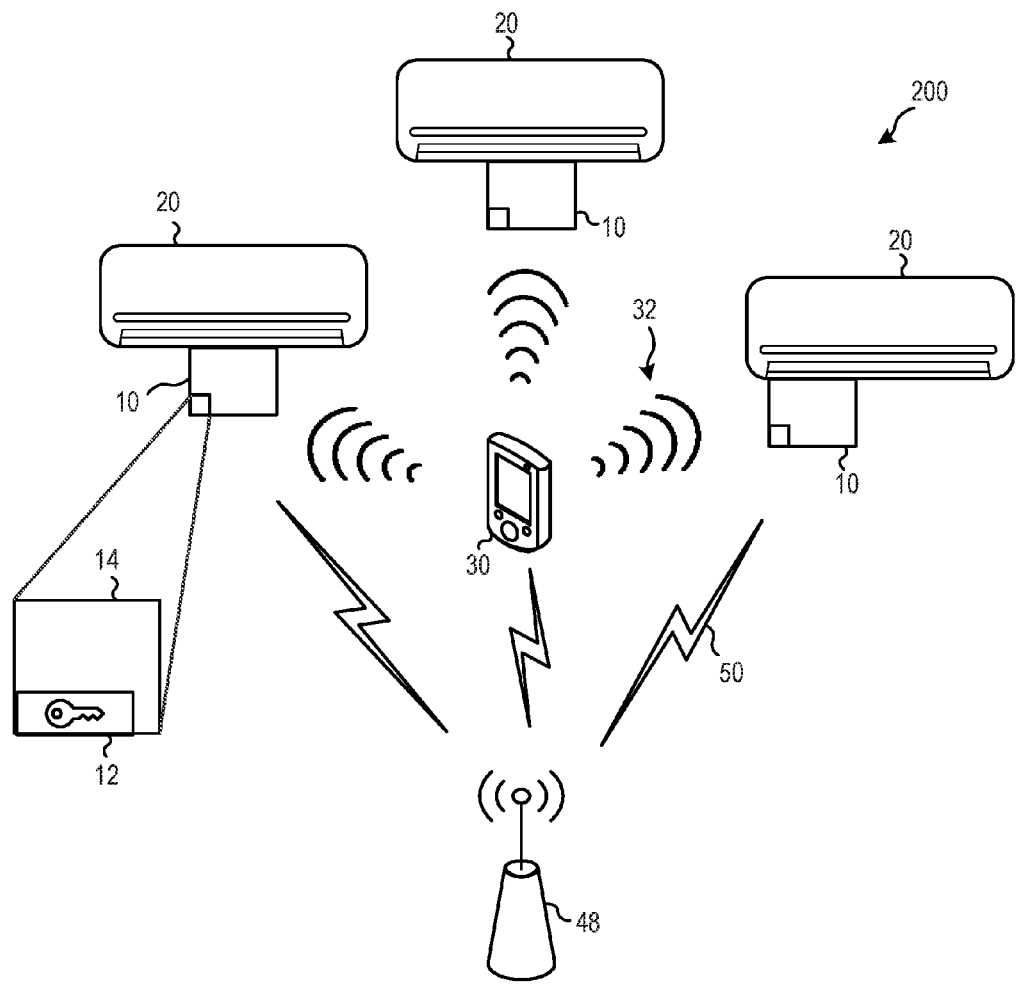
FIG. 2 shows endpoints connected to the local wireless network according to the disclosed embodiments.

FIGS. 1 and 2 shows that the commissioning device 30 communicates between the endpoints 10 via a personal area network 32. The communication device 30 provides the wireless credentials to each of the endpoints 10. This allows the endpoints 10 to connect to a wireless access point 48, and thus access the local wireless network 50.

FIG. 1 also shows a user 32, who inputs wireless credentials (such as a service set identifier and a passphrase) into the commissioning device 30 in order to initiate the provisioning system 100 to connect the endpoint 10 to the wireless network 50.

In general, the provisioning system 100, in some embodiments, uses symmetric encryption based on session keys derived from two pre-shared keys 12, 44 located on the endpoint 10 and the web service 40. In order to communication information between the web service 40 and an endpoint 10 that is unconnected to the wireless network 50, the provisioning system 100 uses the commissioning device 30 to relay communications.

Endpoints

FIG. 1 shows an endpoint 10 that provides wireless connectivity to an electronic device 20. For example, the endpoint 10 in some embodiments is a wireless adapter that physically connects to an electronic device 20. Without the endpoint 10, the electronic device 20 would be unable to connect to a wireless network 50. The endpoint 10 may not include a user interface.

However, the provisioning system of the present disclosure is not limited to this particular arrangement. In some embodiments, the endpoint 10 is the electronic device 20 itself. For example, FIG. 2 shows a provisioning system 200 in which the endpoint 10 and the electronic device 20 are the same device. In other embodiments, the endpoint 10 may be already installed within the electronic device 20.

In the provisioning system 100 shown in FIG. 1, the endpoint 10 includes at least two forms of communication. First, the endpoint 10 can communicate via a local wireless network 50. Second, the endpoint 10 can communicate via a personal area network 32 (such as Bluetooth or other range-limited communication). The endpoint 10 includes particular components that allow both local wireless network communications 50 and personal area network communication 32, as understood by one skilled in the art. The endpoint 10 may be configured to transmit only pre-determined information over the personal area network 32.

As shown in FIG. 1, the endpoint 10 includes a pre-shared encryption key 12 ("pre-shared key") that may be installed on the endpoint 10 at the point of manufacture. That is, the pre-shared key 12 may be installed on the endpoint 10 prior to connecting the endpoint 10 to a user's 32 wireless network 50. The endpoint 10 also includes a universally unique identifier, which may be transferrable only over a personal area network 32.

The universally unique identifier is a code (i.e., a string) unique to each endpoint 10. In general, the universally unique identifier is a combination of numbers and/or alphabetical letters. In order to easily make the universally unique identifier for each endpoint 10, the universally unique identifier incorporates all or some of a date code, a model code, engineering location, lot numbers, and an actual serial number in some embodiments. In other embodiments, the universally unique identifier is generated with any random numbers or strings of alphanumeric characters. However, the universally unique identifier is not limited to these particular arrangements. That is, the universally unique identifier can be any code (i.e., string) as long as no two endpoints used the same code (i.e., string).

The universally unique identifier may be installed at the point of manufacture. The provisioning system 100 may use the universally unique identifier along with the pre-shared key 12 in order to securely connect the endpoint 10 to the local wireless network 50.

Figure 4:
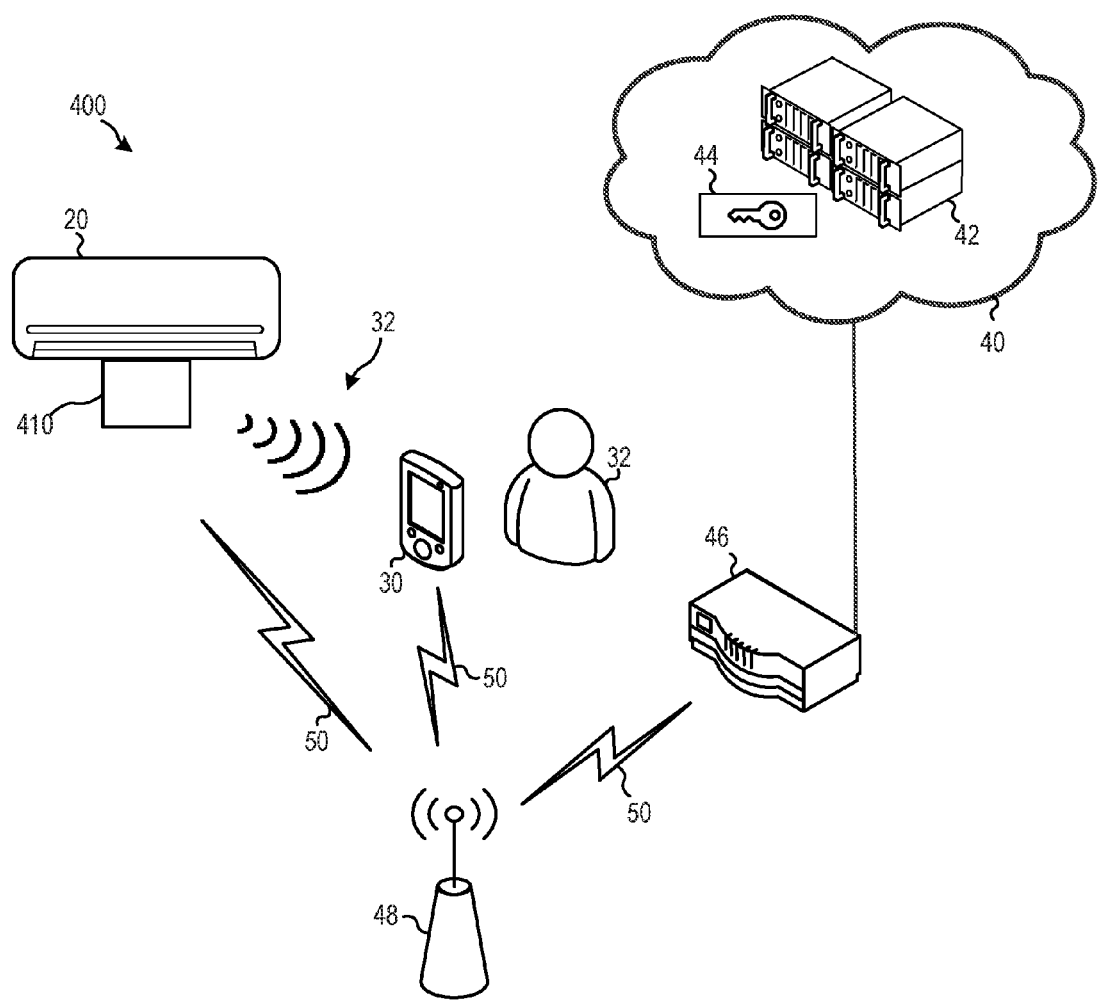
FIG. 4 shows a provisioning system that includes an endpoint without a pre-shared encryption key according to the disclosed embodiments.
Figure 10:
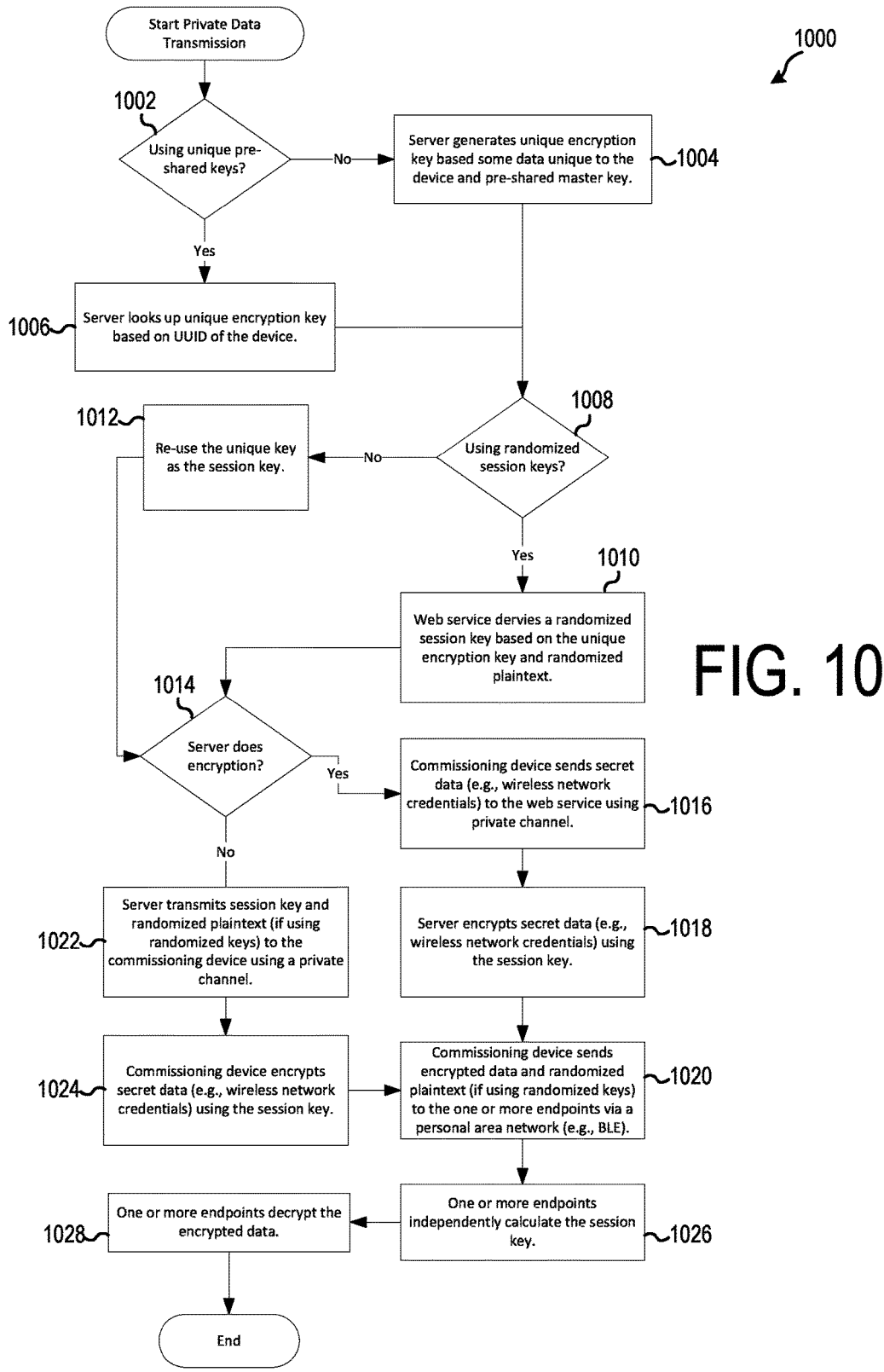
FIG. 10 shows a flowchart for the private data transmission of the provisioning system of FIGS. 1-4 according to the disclosed embodiments.

Although the endpoint 10 in FIG. 10 includes a pre-shared key 12, the provisioning system of the present disclosure is not limited to this embodiment. For example, FIG. 4 shows a provisioning system 400 that includes an endpoint 410 without a pre-shared key 12. The endpoint 410 in provisioning system 400 does include a universally unique identifier, similar to the endpoint 10 shown in FIG. 1.

Since the endpoint 410 shown in FIG. 4 does not include a pre-shared key 12, a web service 40 located on a server 42 may create a key for the endpoint 410. This allows the provisioning system 400 to follow the same security standards set of provisioning system 100, with at least one additional step of creating a key for the endpoint 410.

In the embodiments that include a pre-shared key 12, such as shown in FIG. 1, the endpoint 10 securely stores the pre-shared key 12 within barriers that prevent tampering or unauthorized physical access to the pre-shared key 12. For example, FIG. 1 shows that the pre-shared key 12 is stored within physical barriers 14, such as included in a cryptochip (for example, a cryptoprocessor). The physical barriers 14 may include physical security measures that prevent unauthorized access.

In some embodiments, the physical barriers 14 may be configured such that tampering with the device causes the physical barriers 14 to automatically erase data stored within the device, including the pre-shared key 12. For example, the pre-shared key 12 may be stored on an electrically erasable programmable read-only memory (EEPROM) housed within an active shield. The physical barriers 14 may also include internal memory encryption, security test modes, glitch protections, and voltage tampering detection.

The above-mentioned physical barriers 14 provide an additional level of security beyond that provide at the data transmission level. These features allow sensitive data to be stored, and processed, within the endpoint 10 itself, despite security concerns.

Electronic Devices

In some embodiments, the endpoints 10 physically attach to an electronic device 20 in order to provide wireless connectivity. For example, FIGS. 1-4 show that the electronic device 20 is a split-type indoor unit ("indoor unit") for a ductless heating, ventilation, and air-conditioning system ("air-conditioning system"). That is, the indoor unit is a component of a larger an air-conditioning system that conditions air for an interior space of a home or an office building.

The features of some electronic devices 20 may make it difficult to connect an electronic device 20 to a wireless network 50. For example, an indoor unit of an air-conditioning system does not typically include a user interface to allow a user 32 to connect the indoor unit to a wireless network 50. Furthermore, indoor units for an air-conditioning system may be installed in difficult to reach places that make access impractical.

For example, an indoor unit may be installed at a point on a wall beyond the reach of a user 32. Because of the typical installation position of an indoor unit, it is impractical to require physical access to the electronic device 20 in order to connect the indoor unit to a wireless network 50. Furthermore, even if an indoor unit included a user interface, the installation position typically prevents a user 32 from accessing the indoor unit's user interface. To further complicate matters, these difficulties increases as the number of indoor units that require internet connectivity increases. Many buildings (homes and offices) include several indoor units that require initial provisioning.

Figure 3:
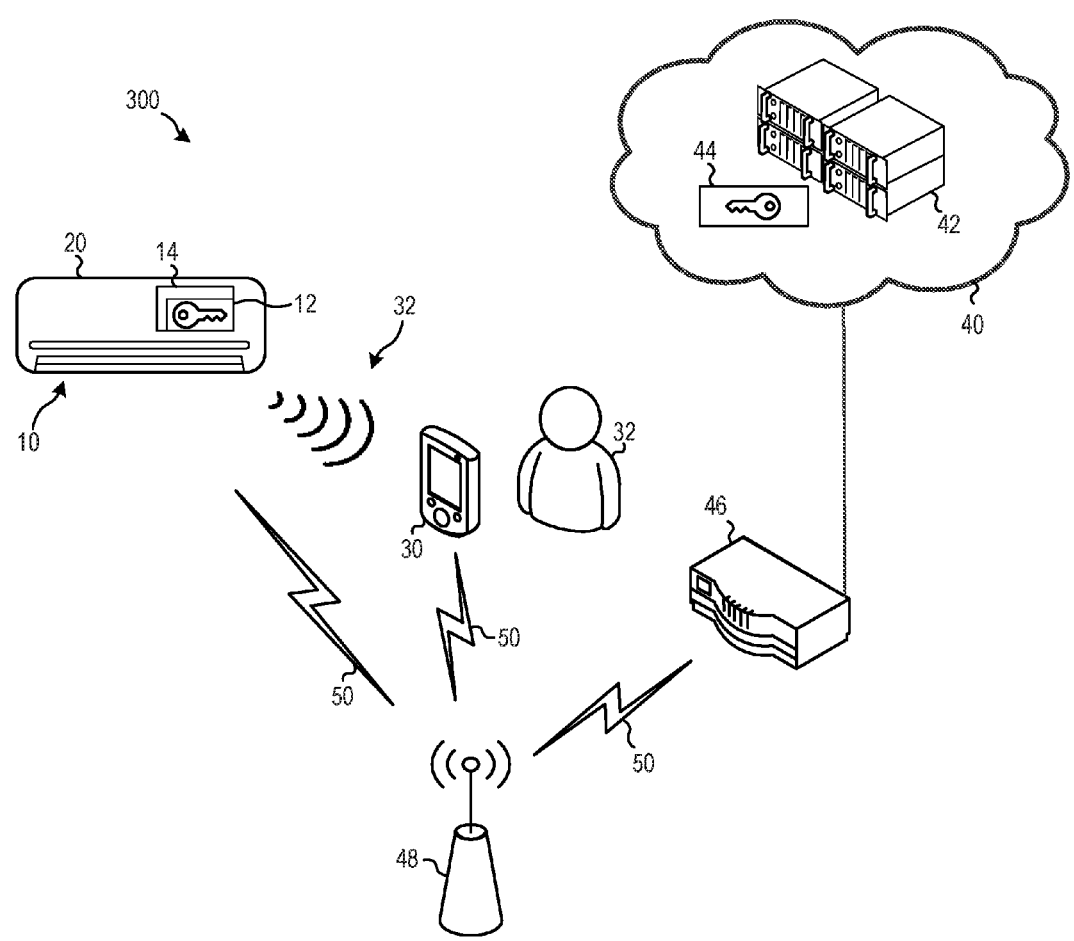
FIG. 3 shows a provisioning system in which the endpoint is the electronic device unconnected to the local wireless network according to the disclosed embodiments.

As mentioned above, the electronic device 20 may include an endpoint 10 preinstalled within the electronic device 20 itself. For example, FIG. 3 shows an electronic device 20 that is an endpoint 10. In other words, the endpoint 10 may be an indoor unit. In this embodiment, the electronic device 20 also includes the pre-shared key 12 and the physical barriers 14, discussed above.

Although the electronic devices 20 shown in FIGS. 1-4 are indoor units for air-conditioning systems, the present disclosure is not limited to these embodiments. Instead, the electronic device 20 may be any device that requires internet connectivity.

Commissioning Devices

The provisioning system of the present disclosure also includes a commissioning device 30 that relays communications between the endpoint 10 and the server 42. For example, FIGS. 1-4 show a commissioning device 30 as a smart phone (i.e., a mobile phone with a mobile operating system). However, the provisioning system of the present disclosure is not limited to this embodiment. Instead, the commissioning device 30 can be any electrical device that can relay communications between the endpoint 10 and the web service 40 on the server 42. The commissioning device 30 provides communications based on at least a personal area network 32 and a cellular network, and includes the components to perform these respective communications, as understood by one skilled in the art. In other embodiments, the commissioning device 30 may also be able to communicate with the server 42 over the local area network 50, and include the components required to communicate over a local area network 50, as understood by one skilled in the art.

In general, the ability of the commissioning device 30 to communicate with the endpoint 10 through a personal area network 32 (such as Bluetooth) allows the web service 40 on the server 42 to confirm that the commissioning device 30 is located in proximity with the endpoint 10. This is because a personal area network 32 provides a range-limited communication. The range-limited communication may be within 200 m, and may be within 100 m. This feature is referred to as co-location.

The endpoints 10 may be configured to transmit pre-determined data across the personal area network 32 only. The pre-determined data may be the universally unique identifier. This feature, as discussed in greater detail below, allows the provisioning system of the present disclosure to prove ownership of the endpoint 10 to the web service 40 on the server 42.

The provisioning system of the present disclosure transmits communications between the endpoint 10 and the server 42 via the commissioning device 30, since the endpoint 10 is not initially connected to the wireless network 50. In general, a user 32 inputs wireless credentials into the commissioning device 30. Conversely, the commissioning device 30 accepts (i.e., obtains) the wireless credentials from the user 32. The commissioning device 30 then provides the endpoint 10 with the wireless credentials so that the endpoint 10 can connect to the wireless access point 48. However, the commissioning device 30 performs numerous communications between the endpoint 10 and the web service 40 located on the server 42 (as discussed in greater detail below) in order to securely transfer the wireless credentials to the endpoint 10.

The commissioning device 30 is an untrusted electronic device. That is, a device that the web service 40 on the server 42 identifies as a potential security threat, and thus the web service 40 will not openly transmit sensitive information to the device. However, the provisioning system of the present disclosure performs numerous security steps in order to ensure that the wireless credentials are securely transferred to the endpoint 10.

Web Service on a Server

The provisioning system of the present disclosure includes a web service 40 located on a server 42. The web service 40 is a system that provides machine-to-machine interaction over a network. A web service 40 is similar to a website without a user interface. For example, the provisioning system 100 shown in FIG. 1 shows a web service 40 located on a server 42. The web service 40 includes a symmetric, pre-shared master-key 44 ("pre-shared master key"). The pre-shared master key 44 may be the same as the pre-shared encryption key 12 ("pre-shared master key") located on the endpoint 10. Since the pre-shared master key 44 and the endpoint 10 match, the pre-shared key 12 and the pre-shared master key 44 allow the provisioning system 100 to securely transfer information.

More generally, the interactions between the web service 40 located on the server 42 and the commissioning device 30 allow the provisioning system 100 to securely connect the endpoints 10 to the wireless network 50. In doing so, the web service 40 automatically performs numerous operations in order to minimize the inputs required from a user 32. Since the endpoint 10 may not directly connect to the web service 40 prior to being connected to the wireless access point 48, the web service 40 sends communications to the endpoint 10 through the commissioning device 30.

For example, the web service 40 and the commissioning device 30 may communicate via a cellular network (such as 3G, 4G, 4G LTE, WiMAX), as understood by one skilled in the art. As mentioned above, the commissioning device 30 communicates with the endpoint 10 via a personal area network (i.e., a range-limited network). Thus, the web service 40 indirectly communicates with the endpoint 10 through the commissioning device 30. This indirect communication is the result of both cellular network communications and personal area network communications 32.

In some embodiments, the communications that occur between the commissioning device 30 and the web service 40 located on the server 42 can include additional layers of security. For example, the cellular network communications can include layers of encryption, as understood by one skilled in the art.

In other embodiments, the web service 40 located on the server 42 may create an encryption keys for the endpoints 410 without pre-shared keys 12. For example, the web service 40 shown in the provisioning system 400 of FIG. 4 creates a key for each endpoint 410, since the endpoint 410 does not already include a pre-shared key 12. In order to do so, the web service 40 creates an encryption key based on the pre-shared master key 44 and a universally unique identifier of the endpoint 41, as discussed in greater detail below. For example, the web service 40 located on the server 42 may create that key for the endpoint 410 using the pre-shared master key 44 and some unique data associated with the endpoint 410. This unique data (for example, an endpoint's 410 serial number) may be different than the universally unique identifier.

Although the present disclosure explicitly refers to a web service 40 on a single server 42, one skilled in the art understands that the web service 40 may be located multiple servers 42.

Operation of the Provisioning System

Figure 5:
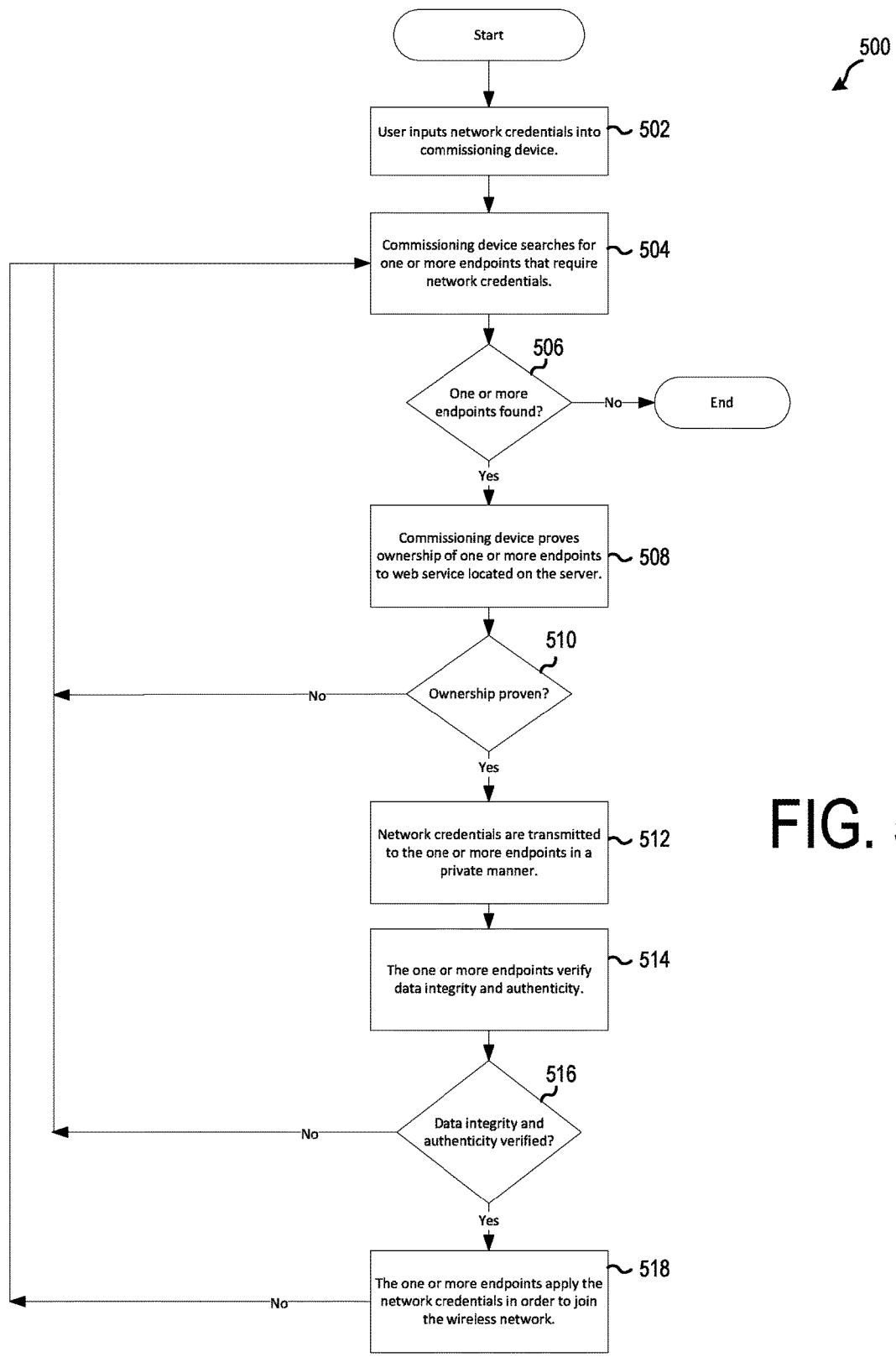
FIG. 5 shows a flowchart that provides an overview of the provisioning system of FIGS. 1-4 according to the disclosed embodiments.

FIG. 5 is a flow diagram that shows an overview of the provisioning system 500 of the present disclosure. The user 32 inputs wireless network credentials into the commissioning device 30 (502). Conversely, the commissioning device 30 accepts (i.e., obtains) the wireless credentials from the user 32 (502). As mentioned above, the wireless network credentials may include information that the endpoint 10 requires to access the wireless access point 48 and associated wireless network 50. For example, the wireless network credentials may include the service set identifier and the passphrase of the wireless access point 48.

After the commissioning device 30 obtains the wireless credentials, the commissioning device 30 searches for endpoints 10 that require network credentials (504). In other words, the commissioning device 30 searches for endpoints 10 that are currently unconnected to the wireless network 50 (504).

The commissioning device 30 then determines whether endpoints 10 unconnected to the wireless network are found (506). If the commissioning device 30 fails to find any endpoints 10 that requires network credentials, the provisioning system 500 may end. On the other hand, if the commissioning device 30 finds an endpoint 10 unconnected to the wireless network 50, then the provisioning system 500 proceeds with the provisioning system 500. Note that the commissioning device 30 searches for the endpoints 10 over a personal area network 32 (such as Bluetooth or Bluetooth Low Energy 4.0). In other words, the commissioning device 30 searches for the endpoints 10 over a range-limited network.

After the commissioning device 30 finds one or more endpoints 10, the commissioning device 30 attempts to prove ownership of the endpoints 10 to the web service 40 on the server 42 (508). Ownership may be proven by showing that the commissioning device 30 and the endpoint 10 are in proximity with each other, and thus an unauthorized user (such as a hacker) is not attempting to manipulate the endpoint from afar.

For example, the commissioning device 30 may retrieve a universally unique identifier from each of the found endpoints 10 over the personal area network 32 and provide each of the retrieved universally unique identifiers to the server 42, as discussed in greater detail below. Afterwards, the server 42 determines whether the received data establishes the ownership of the endpoints 10 (510). If the commissioning device 30 proves the ownership of the one or more endpoints 10, network credentials are privately transmitted to the one or more endpoints 10 (512). For example, the server 42 or the commissioning device 30 may encrypt the wireless network credentials and transfer the encrypted wireless credentials to each endpoint 10 in order to transmit the wireless network credentials in a private manner (512).

After the endpoints 10 receive the encrypted wireless credentials, each endpoint 10 verifies both the integrity and the authenticity of the received encrypted communication and data (514). That is, the endpoint 10 determines whether the encrypted communication meets specific criteria that indicate the endpoint 10 should proceed to decrypt the encrypted data and apply the wireless credentials, as discussed in greater detail further below. In some embodiments, the endpoint 10 may verify the authenticity and the integrity of the encrypted communication simultaneously. For example, the web service 40 may determine that the integrity (i.e., accuracy) of the decrypted communication sufficiently indicates that the communication ultimately originated from a trustworthy source.

Lastly, after the endpoint 10 verifies both the integrity and the authenticity of the encrypted communication, the endpoint 10 applies the network credentials and accesses the wireless access point 48 and associated wireless network 50 (518).

Ownership Verification

FIG. 5 shows that the provisioning system of the present disclosure proves ownership of the endpoints 10 to the server 42 (508). This verification prevents unauthorized access to the endpoint 10 or sensitive data on the endpoint 10 (such as the pre-shared key 12 or access to the web service 40). In general, the provisioning system verifies ownership based on the co-location of the endpoint 10 and the commissioning device 30. That is, web service 40 verifies that the ownership of the endpoint 10 by determining that the commissioning device 30 is within a predetermined spatial range with the endpoint 10. This feature is referred to as co-location.

In order to show that the commissioning device 30 has co-location with the one or more endpoints 10, the commissioning device 30 provides the web service 40 on the server 42 with, for example, information that can only be retrieved from the endpoint 10 over a range-limited wireless communication. For example, the endpoint 10 may include a universally unique identifier, and the endpoint 10 may be configured to share the universally unique identifier over a personal area network 32. The commissioning device 30 may retrieve the universally unique identifier from the endpoint 10, and subsequently provide the universally unique identifier to the web service 40 located on the server 42.

Figure 6:
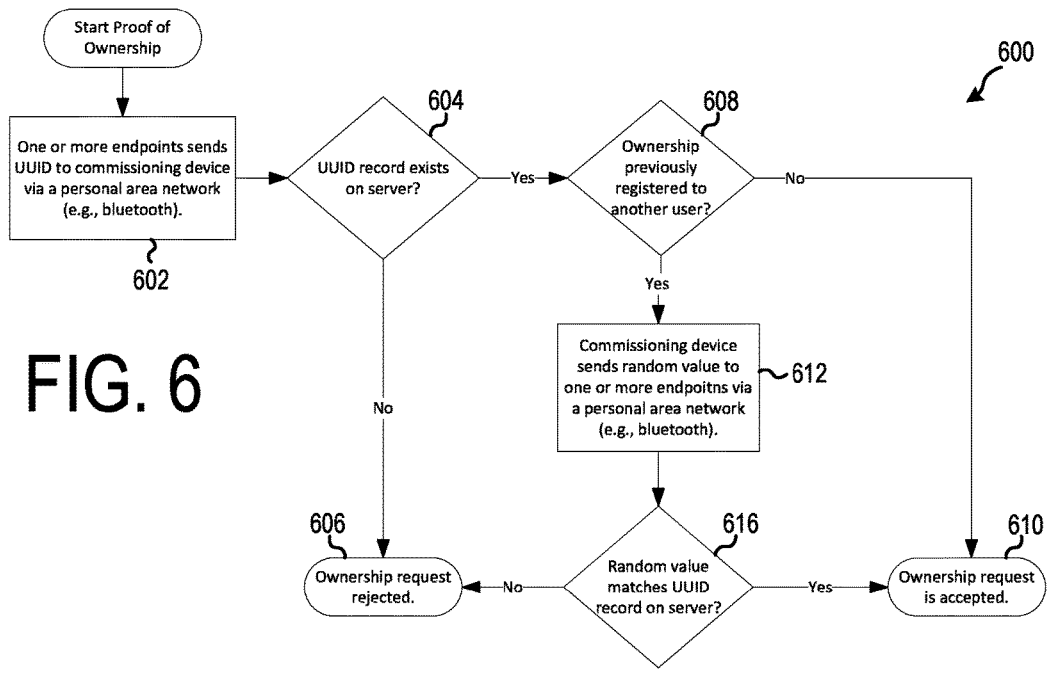
FIG. 6 shows a flowchart for ownership verification within the provisioning system of FIGS. 1-4 according to the disclosed embodiments.
Figure 7:
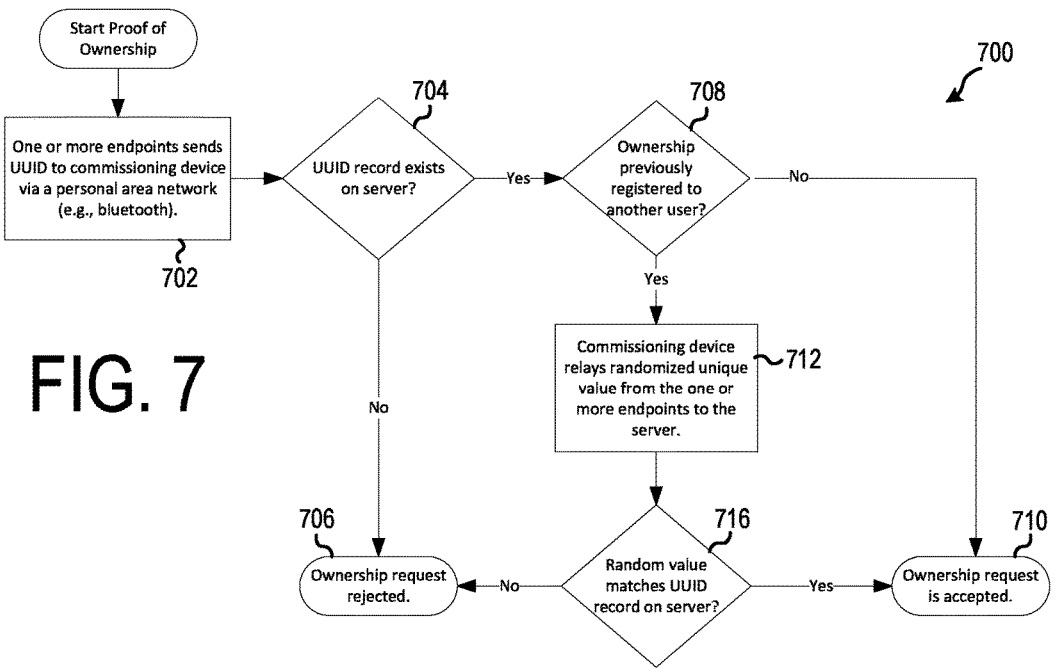
FIG. 7 shows a flowing for ownership verification within the provisioning system of FIGS. 1-4 according to the disclosed embodiments.

For example, FIGS. 6 and 7 show flow charts that proves the ownership of the endpoints 10 to the web service 40 located on the server 42. FIG. 6 shows an ownership verification procedure 600 that begins with the endpoints 10 sending their respective universally unique identifiers to the commissioning device 30 over a personal area network 32 (602). The commissioning device 30 (or the server 42) determines whether the universally unique identifier exists on the server (604). If the universally unique identifier is not located on the server, the server 42 does not verify the ownership of the endpoint 10 (606).

On the other hand, if the universally unique identifier is located on the server 42, the provisioning system determines whether the endpoint 10 is previously registered to another user 32 (608). If the endpoint 10 has not been previously registered to a different user 32, the ownership request is accepted (610). If the endpoint 10 has been previously registered to a different user 32 (608), the ownership verification procedure 600 may require an additional verification step.

For example, the commissioning device 30 may transfer a random value to the one or more endpoints 10 over the personal wireless network 32 (612). If the random value is verified to be associated with universally unique identifier registered on the server 42, then the ownership verification is accepted, as shown in the ownership verification procedure in FIG. 6 (616).

In other embodiments, the provisioning system may include a different ownership verification step when the one or more endpoints 10 are previously registered to another user 32. For example, FIG. 7 shows that the commissioning device 30 may relay a randomized unique value ("randomized value") from the one or more endpoints 10 to the server 42 (712). The randomized value may be, or be based on, a Wi-Fi Protected Access (WPA) key that the user previously input as a wireless network credential. If the randomized value is verified to be associated with the universally unique identifier of each endpoint 10, then the ownership verification is accepted (710).

Although the above description, and FIGS. 6 and 7, show that the commissioning device 10 and the server 42 performs particular steps, the provisioning system of the present disclosure is not so limited to these embodiments. In other words, the commissioning device 10 or the server 42 (and web service 40) may perform any of the steps shown in the flowcharts shown in FIGS. 6 and 7, as understood by one skilled in the art.

Private Data Transmission of Wireless Credentials

Figure 8:
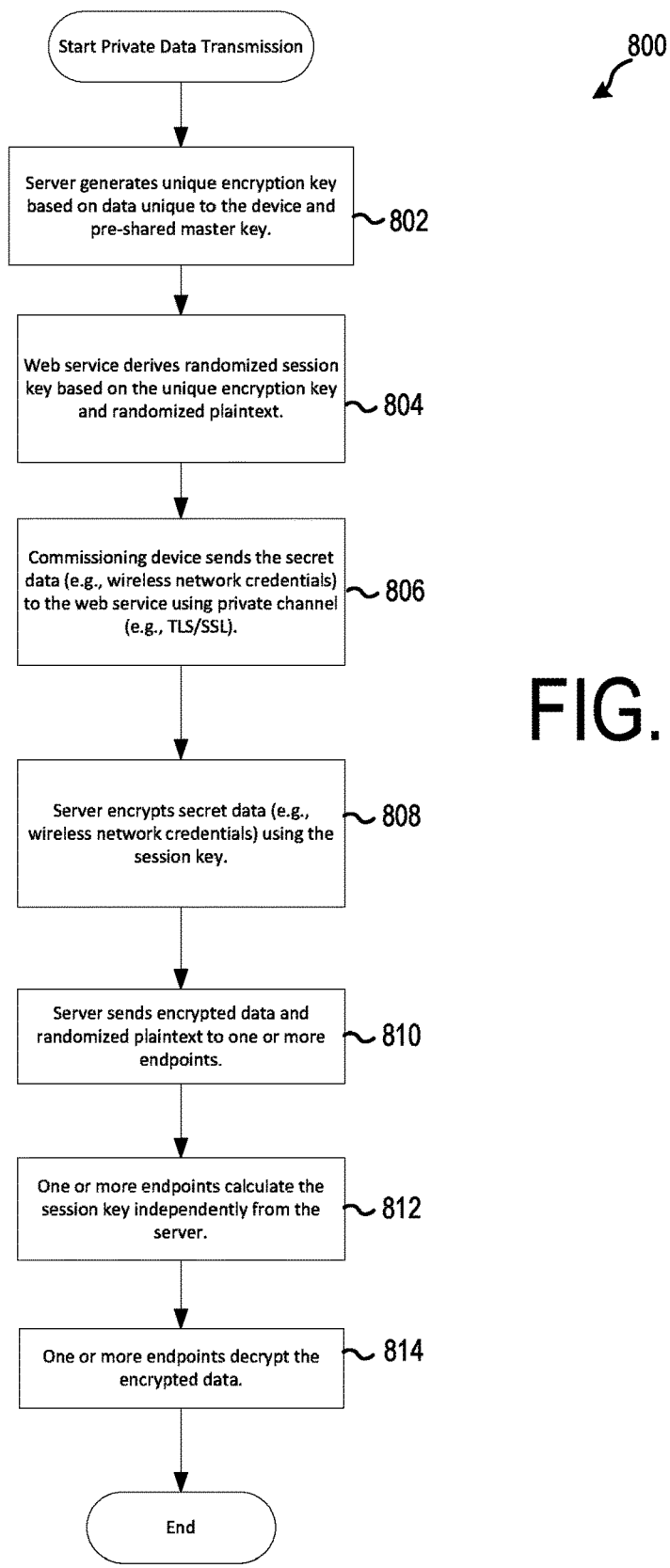
FIG. 8 shows a flowchart for private data transmission with server-based encryption of the provisioning system of FIGS. 1-4 according to the disclosed embodiments.
Figure 9:
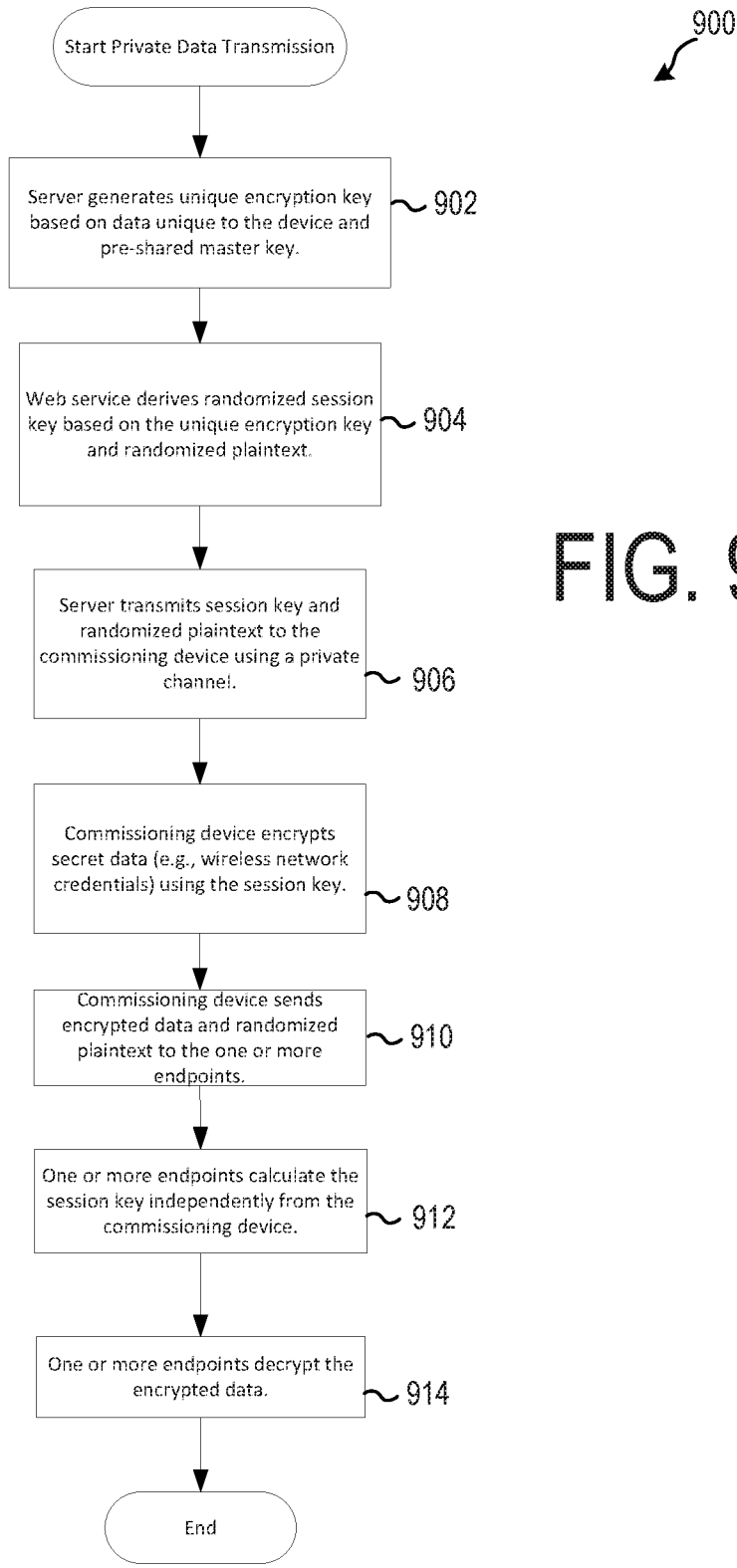
FIG. 9 shows a flowchart for private data transmission with commissioning-device-based encryption of the provisioning system of FIGS. 1-4 according to the disclosed embodiments.

FIG. 5 also shows that after the provisioning system 100 has proven the ownership (i.e., co-location) of the one or more endpoints unconnected to the wireless network (510), the web service 40 on the server 42 transmits the wireless network credentials to the one or more endpoints 10 via secure network-credential communication (i.e., a private data transmission) (512). FIGS. 8-10 provide a more detailed view of this transition. For example, FIGS. 8-10 are flow diagrams that show embodiments of the private data transmission.

Although the server 42 has determined that the one or more endpoints 10 are within proximity of the commissioning device 30, the provisioning system of the present disclosure securely transmits information to the one or more endpoints in order to prevent unauthorized access to the underlying data. Thus, the provisioning system provides an additional layer of security.

However, in some embodiments, both the one or more endpoints 10 and the web service 40 include pre-shared encryption keys. For example, FIG. 1 shows that the endpoint 10 includes a pre-shared key 12 and that the web service includes a symmetric, pre-shared master key 44. The server 42 may use stream encryption based on the pre-shared master key 44 and the pre-shared key 12 on the endpoint 10. As noted above, the endpoint's 10 pre-shared key 12 is securely located within physical barriers 12 that prevent unauthorized physical access to the pre-shared key 12. Thus, since the pre-shared key 12 in inaccessible, the provisioning system 100 secures the privacy of other all other users' 32 communications.

In other embodiments, the endpoint 10 may not include a pre-shared key 12, such as the provisioning system 400 shown in FIG. 4 and discussed above. In these embodiments, the server 42 may create a pre-shared key 12 for each of the endpoints 410, which do not include a pre-shared key 12.

For example, the private data transmission 800 shown in FIG. 8 has the server 42 generate a unique encryption key based on data unique to each endpoint 10 and a pre-shared master key 44 located on the server 42 (802), such as a serial number of the endpoint 10 or the electronic device 20. The data unique to each endpoint 10 may already be located on the server 42, or may be transmitted to the server 42. In some embodiments, the data unique to each endpoint 10 is different than the universally unique identifier discussed above.

After the web service 40 receives the data unique to the endpoint 10, the server 42 may derive a randomized session key based on the pre-shared master key 44 (i.e., a unique encryption key) and randomized plain text (804). The randomized plain text can be any text.

Furthermore, in the private data transmission 800 shown in FIG. 8, the commissioning device 30 sends the wireless network credentials (i.e., secret data) to the web service 40 using a private channel (806), such as transport layer security/secure socket layer (TLS/SSL). After receiving the wireless network credentials, the server 42 encrypts the wireless credentials using the derived randomized session key (808). Then, the server 42 sends the encrypted data and randomized plaintext to each of the endpoints 10 (810). After receiving the encrypted data, each of the endpoints 10 independently calculate the session key (812). After doing so, the endpoints 10 decrypt the encrypted data (814) to access the wireless network credentials.

Although the private data transmission 800 shown in FIG. 8 has the server 42 perform the encryption, the commissioning device 30 may perform the encryption in other embodiments. This feature mitigates any potential venerability that may be involved when transferring the wireless network credentials to the server 42.

For example, the private data transmission 900 shown in FIG. 9 also has the web service 40 derive a randomized session key based on the pre-shared master key 44 (i.e., a unique encryption key) and randomized plain text (904). However, in the embodiment shown in FIG. 9, the server 42 transmits the session key and the randomized plaintext to the commissioning device 30 without encrypting the wireless network credentials (906). After receiving the data, the commissioning device 30 encrypts the wireless network credentials (i.e., secret data) using the received session key from the server 42 (908).

Afterwards, the commissioning device 30 sends the encrypted data and randomized plaintext to each of the endpoints 10 (910). The endpoints 10 then calculate the session key independently from the commissioning device 30 (912), and subsequently decrypt the encrypted data received from the commissioning device 30.

FIG. 10 shows various embodiments of private data transmission 1000. Specifically, FIG. 10 shows that the provisioning system of the present disclosure may include pre-shared keys 12, 44 in the server 42 and each of the endpoints 10 (1002). If the provisioning system does include pre-shared keys 12, 44, the server 42 either looks up the unique encryption key based on the universally unique identifier of each endpoint 10 (1006). Otherwise, the server 42 generates a unique encryption key for each endpoint (1004).

The provisioning system of the present disclosure may also use randomized session keys (1008) for each endpoint 10. If the provisioning system does not use a randomized session key, the provisioning system uses the pre-shared key 12 in each endpoint 10 as the session key for encryption (1012). If the provisioning system uses a randomized session key, the web service 40 may derive a randomized session key based on the pre-shared master key 44 (i.e., a unique encryption key if the endpoints 10 do not include pre-shared keys 12) and randomized plaintext (1010).

As mentioned above, the server 42 or the commissioning device 30 may perform the encryption (1014). If the server performs the encryption (as also shown in FIG. 9), the commissioning device 30 sends the wireless credentials to the web service 40 over a secure channel (1016). The server 42 encrypts the secret data (1018), and sends the encrypted data to the commissioning device 30 (1020), as also shown in FIG. 9.

On the other hand, if the commissioning device 30 performs the encryption (as also shown in FIG. 8), the server 42 transmits the session key and the randomized plaintext (if applicable) to the commissioning device 30 over a private channel (1022). The commissioning device 30 then encrypts the secret data using the session key (1024).

After either the server 42 or the commissioning device 30 encrypts the wireless credentials, the commissioning device 30 sends the encrypted data to each of the endpoints 10 over a personal area network 32. If the provisioning system includes randomized session keys, the commissioning device 30 also sends the randomized session keys to each of the endpoints 10, respectively, over the personal area network 32 (1020). This may occur in the same transmission or in separate transmissions. After doing so, the endpoints independently calculate the session key (1026), and subsequently decrypt the encrypted data (1028).

Data Authentication

As shown in FIG. 5, the provisioning system of the present disclosure verifies the both the integrity and the authentication of the secure network-credential communication (i.e., the private data transmission) (514). As mentioned above, the provisioning system 100 may simultaneously verify and authenticate the private data transmission. In other embodiments, these steps may be performed separately.

Figure 11:
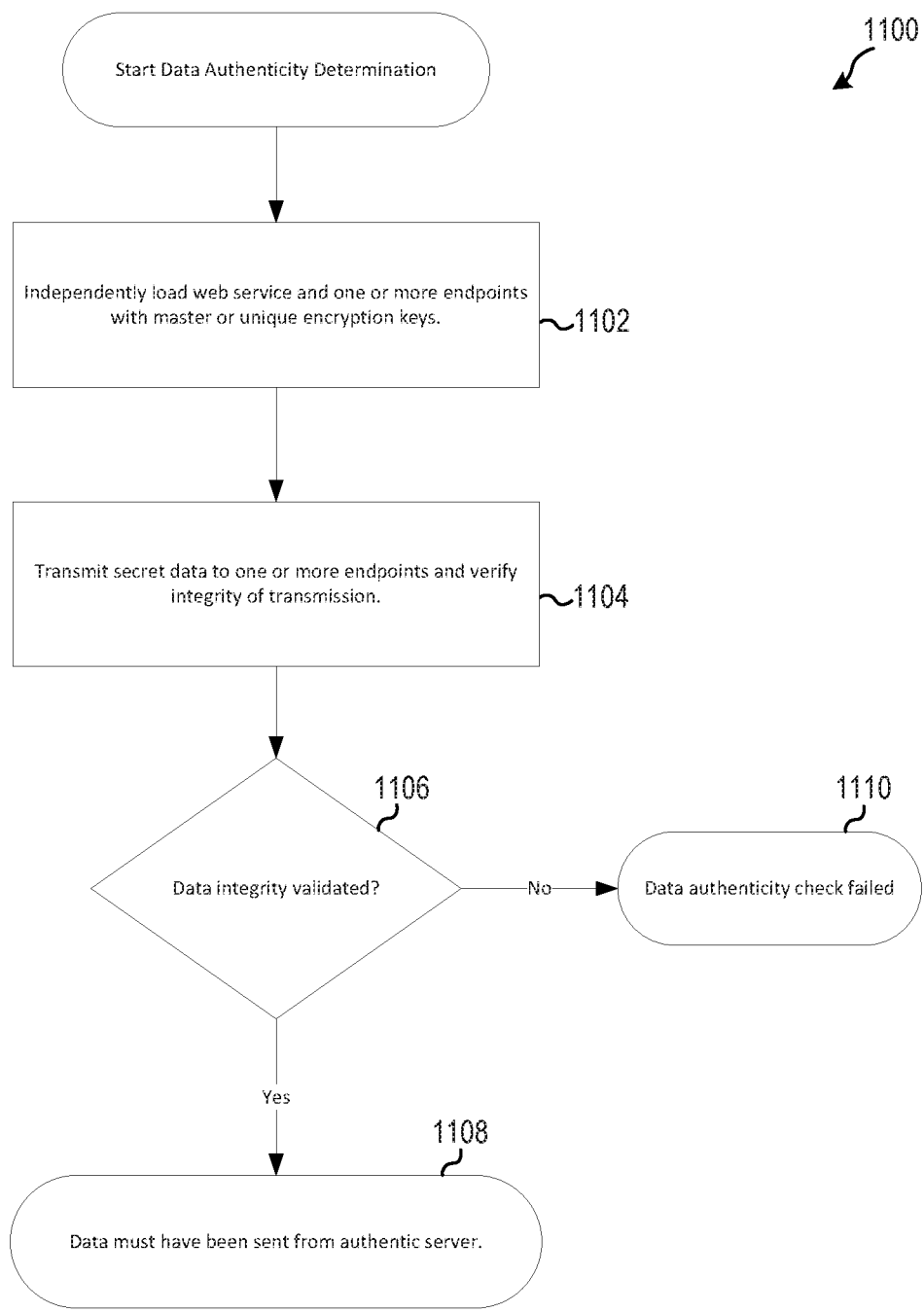
FIG. 11 shows a flowchart for data authentication within the provisioning system of FIGS. 1-4 according to the disclosed embodiments.

For example, FIG. 11 shows a data authentication procedure 1100 of the provisioning system 100. The provisioning system may include a pre-shared master key 44 (i.e., a unique encryption key) on the server 42 and may include (or create) a pre-shared key 12 for each endpoint 10 (1102). The provisioning system 1104 may transmit secret data (i.e., the encrypted network-credentials) to the one or more endpoints and verify the integrity of the transmission (1104). The data authentication procedure 1110 of the provisioning system determines the integrity (i.e., accuracy) of the transmission (1106). If the integrity is indeed validated, then the provisioning system determines that the data must have been sent from an authentic server 42 (1108). On the other hand, if the integrity is not validated, then the authenticity is also rejected (1110).

Although the above description discusses particular steps to authenticate the data transmitted in the private data transmission, some embodiments do not include a separate authentication procedure. Instead, as mentioned above, the provisioning system may verify the integrity of the private data transmission of the network credentials, which simultaneously indicates the authenticity of the private data transmission.

Data Integrity Verification

Figure 12:
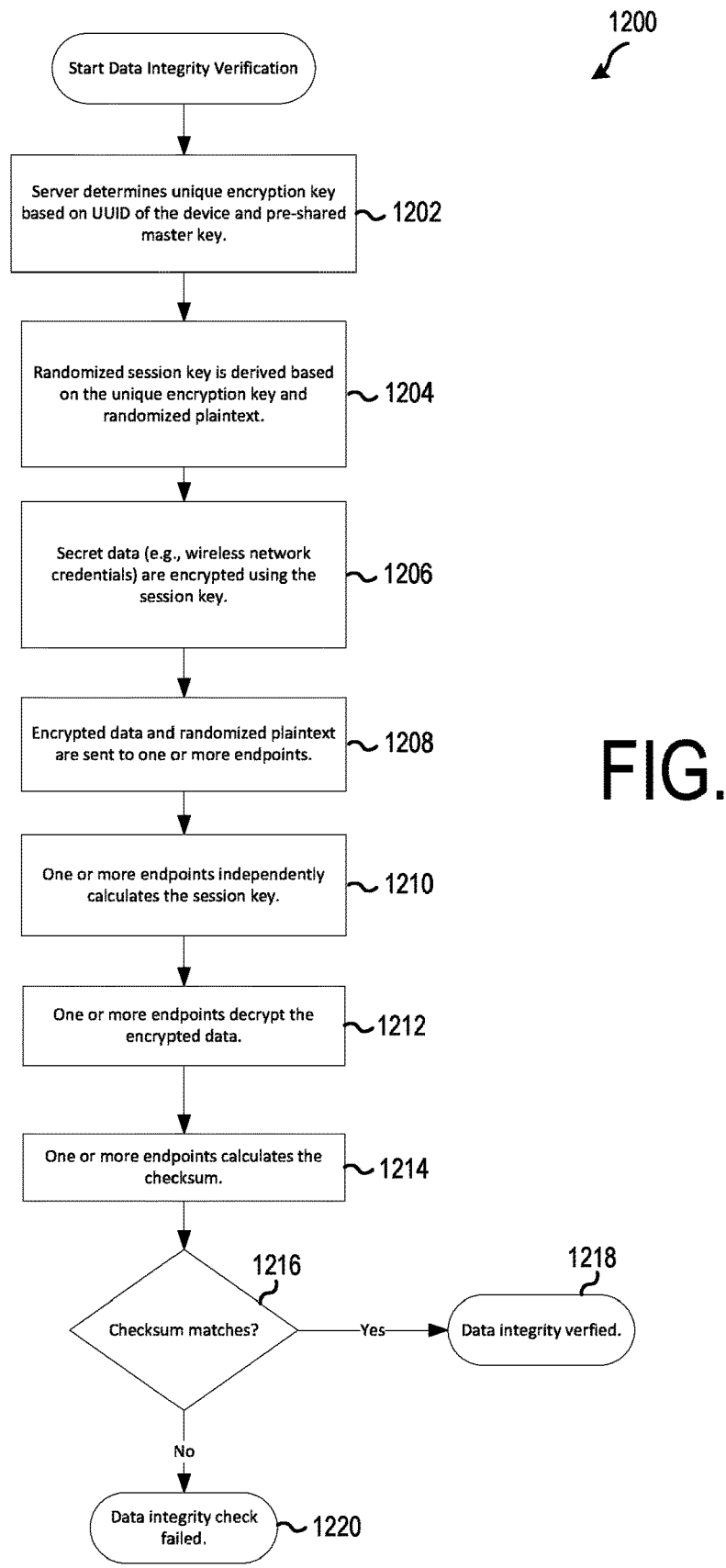
FIG. 12 shows a flowchart for data integrity verification within the provisioning system of FIGS. 1-4 according to the disclosed embodiments.
Figure 13:
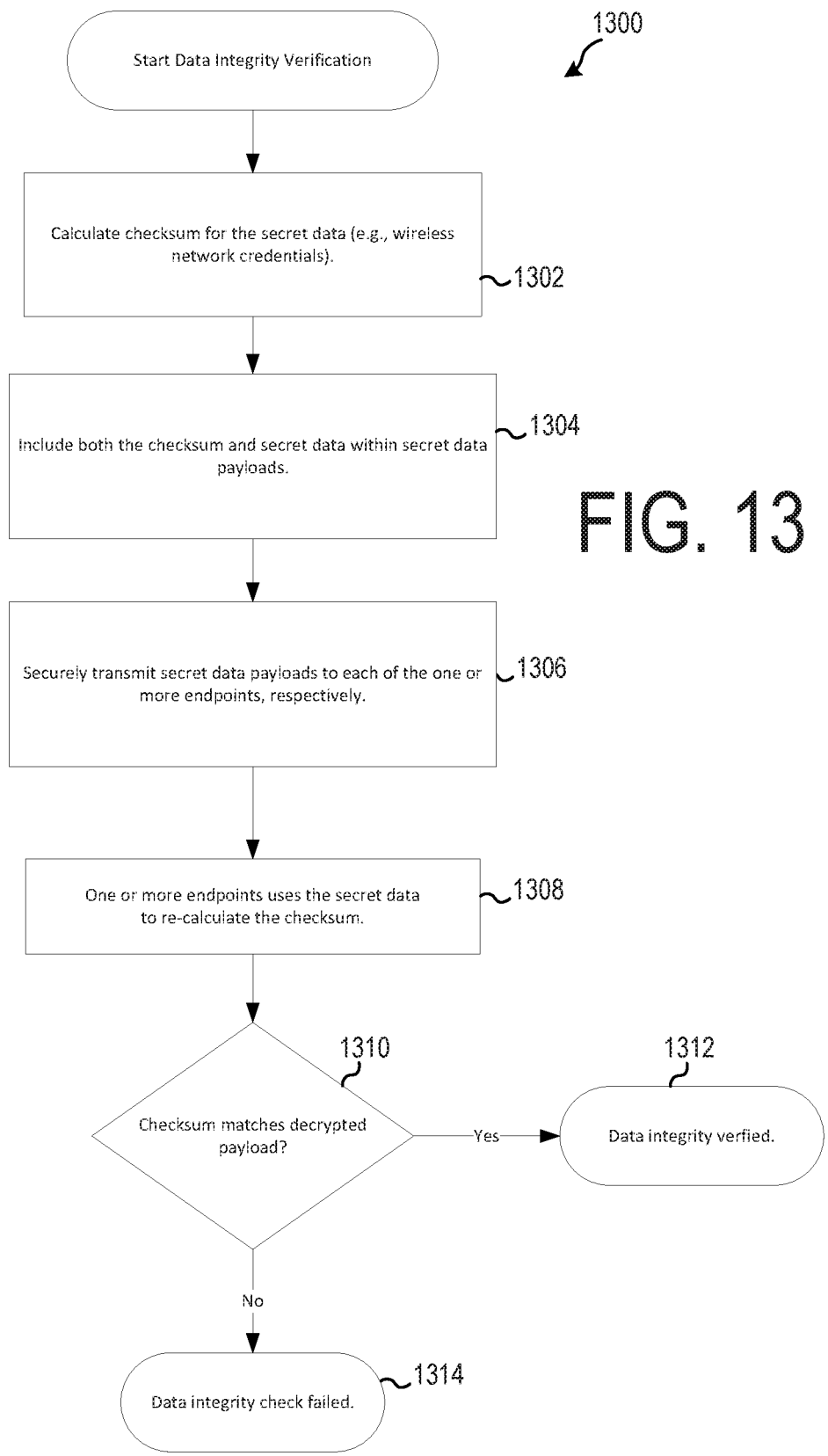
FIG. 13 shows a flowchart for the data integrity verification within the provisioning system of FIGS. 1-4 according to the disclosed embodiments.

As mentioned above, the provision system of the present disclosure may include an authentication procure, and include a data verification procedure 1200 (514), as shown in FIG. 5. However, the verification procedure 1200 may directly indicate the authenticity of the private data transmission without the requirements for separate steps. FIGS. 12 and 13 show how the provisioning system 100 verifies the integrity of the private data transmission (i.e., the secure network-credential communication). Specifically, FIG. 12 shows a general overview of the provisioning system that includes data integrity verification 1200. FIG. 13 provides a more detailed view of the data integrity verification.

As shown in provisioning system with data integrity verification 1200 shown in FIG. 12, the server 42 first determines the unique encryption key based on the universally unique identifier of the endpoint 10 and the pre-shared master key 44 (1202). After doing so, the server 42 creates a randomized session key based on the unique encryption key and randomized plaintext (1204). After the randomized session key is created, either the commissioning device 30 or the server 42 encrypts the wireless network credentials (1205). The commissioning device, either after creating or receiving the encrypted wireless network credentials, transfers the encrypted data and the randomized plaintext to each of the endpoints 10. After receiving the encrypted wireless network credentials and the randomized session key, each of the endpoints 10 independently calculate the session key (1210), and subsequently decrypt the encrypted data (1212), as discussed in greater detail above.

In addition to the general overview of the provisioning system of the present disclosure, the provisioning system 1300 of FIG. 13 also shows an additional data integrity verification step. Specifically, after an endpoint 10 decrypts the encrypted wireless network credentials, the endpoint 30 calculates a checksum (1214). After calculating the checksum, the endpoint 30 compares the endpoint calculated checksum to a different checksum already included with the encrypted data received from the commissioning device 30 (1216).

If the endpoint 10 determines that the two checksums match, then the endpoint confirms the integrity of the private data transmission of the wireless network credentials (1218). On the other hand, if the checksums do not match, then the endpoint 10 cannot confirm that the integrity of the wireless network credentials received form the commissioning device 30 (1220).

FIG. 13 shows a more detailed flowchart of the data integrity verification procedure shown in FIG. 12. In other words, FIG. 13 shows a more detailed view of the calculating of the checksum (1214) and the comparing the checksum (1216) as shown in FIG. 12. The data integrity verification procedure 1300 initially has the commissioning device 30 calculate a first checksum for each endpoint 10 (1302). The commissioning device 30 then combines the first checksum with the encrypted network credentials into a secret data payload for each of the endpoints 10 (1304). After doing so, the commissioning device 30 transfers the secret data payloads to each of the endpoints 10, respectively (1306).

After receiving the secret data payload, each of the endpoints 10 calculates a second checksum using, for example, the secret data payload (1308). In other words, the endpoints 10 re-calculate the first checksum as a second checksum. The endpoint 10 then compares the first checksum created by the commissioning device 30 and the second checksum created by the endpoint 10 itself (1310). If the two checksums match, the data integrity verification procedure 1300 provides an affirmative result (i.e., the integrity of the data is confirmed) (1312). However, if the endpoint 10 determines that the first checksum and the second checksum do not match, then the data integrity verification procedure 1300 provides a negative result (i.e., the integrity of the data cannot be confirmed) (1314).

Although the above discussion refers to the commissioning device 30 performing particular steps, any and/or all of the steps may be performed in the server 42, as understood by one skilled in the art.

Afterwards, each of the endpoints 10 applies the wireless network credentials and connects to the wireless network 50 (518), since each endpoint 10 verifies the integrity and the authenticity of the private data transmission received from the commissioning device 10 (516), as shown in FIG. 5.

User Input

Although the provisioning system 500 shown in FIG. 5 begins with a user 32 inputting wireless network credentials (such as a service set identifier and a passphrase of the wireless access point 48) and the commissioning device accepting (i.e., obtaining) the user-input wireless credentials, the provisioning system of the present disclosure is not limited to this particular arrangement. For example, FIGS. 14 and 15 show provisioning systems with different user 32 interactions.

Figure 14:
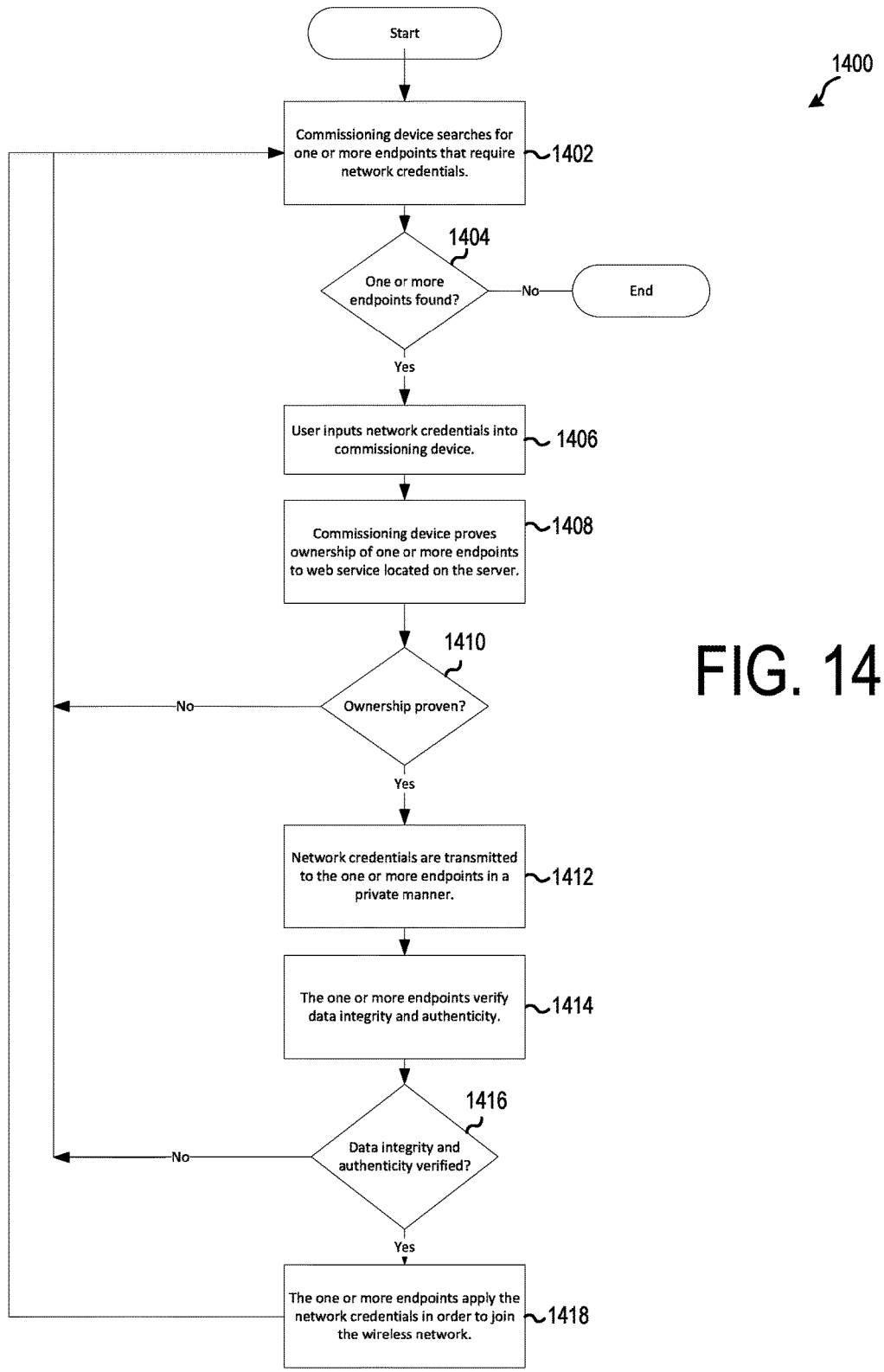
FIG. 14 shows a provisioning system according to the disclosed embodiments.
Figure 15:
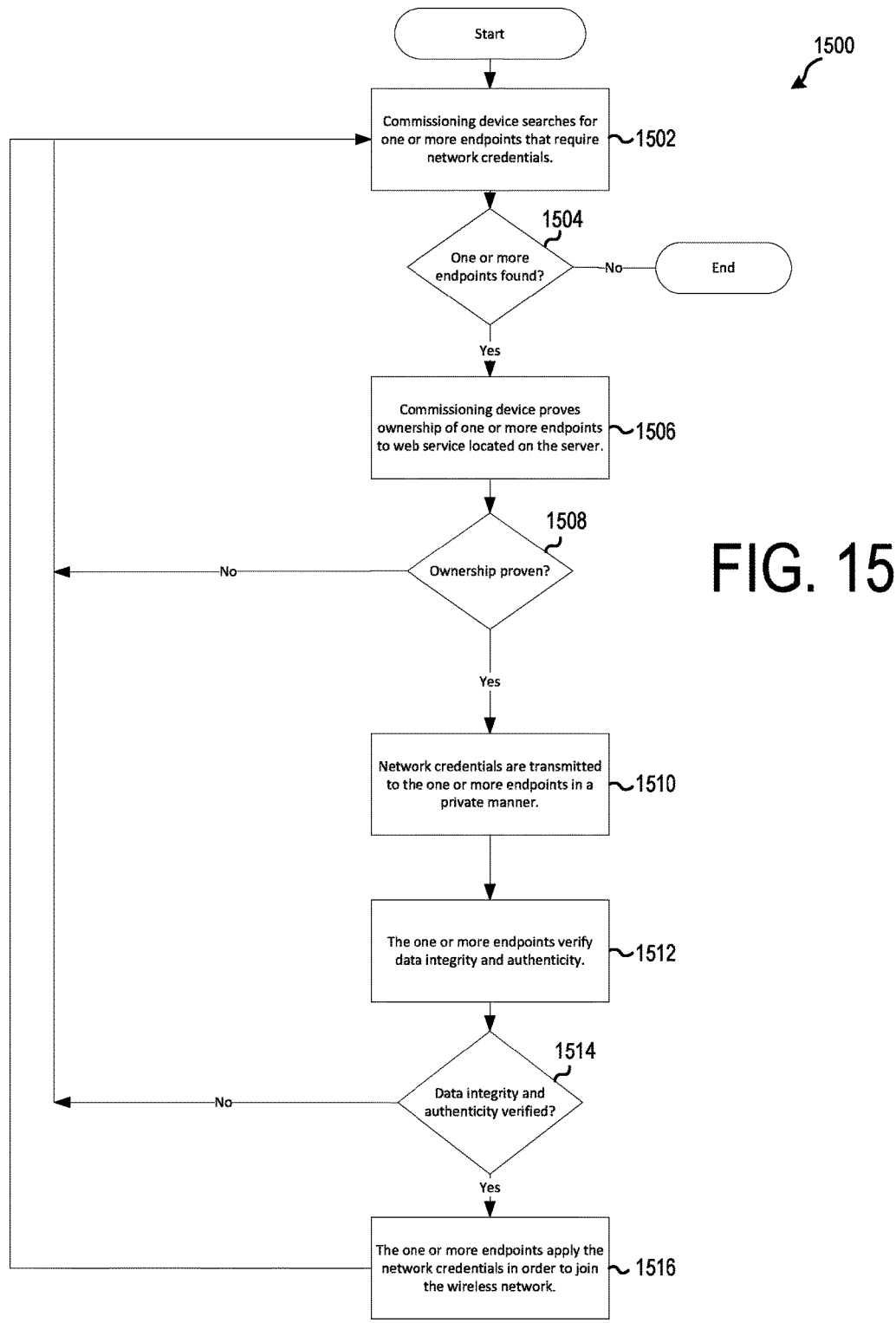
FIG. 15 shows a provisioning system according to the disclosed embodiments.

FIG. 14 shows that the commissioning device 30 initially searches for one or more endpoints 30 unconnected to the wireless network 50 (1402). After the commissioning device 30 finds one or more endpoints 10 (1404), the user 32 then enters the wireless credentials of the wireless access point 48 (1406).

After the user 32 enters the wireless credentials, the commissioning device 30 proceeds to prove the ownership (through co-location, for example) of the found endpoints 10 (1408), as discussed in greater detail above. The provisioning system 1400 then determines whether the ownership meets predetermined criteria (such as co-location) (1410). If so, the commissioning device 30 securely transfers encrypted network credentials to the one or more endpoints 10 (1412). After receiving and decrypting the wireless credentials, each of the endpoints 10 verify the integrity and authenticity of the private communication (1414). If each endpoint 10 verifies the integrity and authenticity of the communication (1416), the one or more endpoints 10 apply the network credentials and access to the local wireless network 50. If not, the provisioning system 1400 may continue to search for endpoints unconnected to the wireless network 50 (1402).

In some embodiments, the provisioning system may access the wireless network credentials without the input from a user 32. For example, FIG. 15 shows a provisioning system 1500 that accesses wireless credentials without a user interaction. As shown in FIGS. 1-4 and discussed above, the commissioning device 30 may be a smart phone. On some platforms, the commissioning device 30 may access wireless credentials previously stored on the commissioning device 30 without user 32 interactions. In these embodiments, the provisioning system 1500 proceeds through the procedure outline in FIG. 15 without interacting with a user. That is, the provisioning system 1500 searches for endpoints (1502), finds endpoints (1504), and attempts to proves ownership of the endpoints to a web service 40 (1506). If the ownership is proven (1508), the commissioning device 30 privately transmits the wireless credentials to the endpoints (1512), which subsequently verify the integrity and authenticity of the received private transmission (1512). After verification (1514), the endpoints apply the wireless network credentials and connect to the wireless access point 48 (1516).

In the embodiments discussed above that include user 32 input, the provisioning system of the present disclosure may simply accept (i.e., obtain) the wireless network credentials (such as a service set identifier and passphrase). That is, specific interaction from the user 32 is not necessarily required for the provisioning system of the present disclosure in some embodiments. Instead, the provisioning system of the present disclosure may only require the acceptance of the wireless network credentials.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method for provisioning multiple devices, comprising:
   accepting, via a commissioning device, user-input network credentials of a wireless network;
   searching, via the commissioning device, for one or more endpoints unconnected to the wireless network;
   verifying, via the commissioning device, ownership of the one or more endpoints to a server;
   securely transmitting, via the commissioning device, a network-credential communication that includes the user-input wireless network credentials from the commissioning device to the one or more endpoints in response to an affirmative verification of ownership;
   verifying, via the one or more endpoints, the integrity and authenticity of the network-credential communication; and
   accessing, via the one or more endpoints, the wireless network based on the wireless network credentials in response to an affirmative verification of the network-credential communication.

2. The method according to claim 1, wherein the one or more endpoints are respectively attached to one or more electronic devices unconnected to the wireless network.

3. The method according to claim 1, further comprising prompting a user to input network credentials into the commissioning device.

4. The method according to claim 1, wherein the verifying of the ownership of the one or more endpoints to a server further comprises
   sending, via the one or more endpoints, at least one pre-stored universally unique identifier from the one or more endpoints to the commissioning devices;
   determining whether the server includes the pre-stored universally unique identifier of the one or more endpoints; and
   confirming the ownership of the one or more endpoints in response to an affirmative determination that the server includes the pre-stored universally unique identifier of the one or more endpoints.

5. The method according to claim 4, wherein the verifying of the ownership of the one or more endpoints to a server further comprises
   determining whether the pre-stored universally unique identifier has been previously registered with the server; and
   sending a randomized value from the commissioning device to the one or more endpoints via a personal area network in response to an affirmative determination that the pre-stored universally unique identifier is previously registered with the server;
   sending the randomized value from the commissioning device to the server in order to confirm the co-location of the one or more endpoints;
   determining whether the randomized value is associated with the universally unique identifier previously registered in the server; and
   confirming the co-location of the one or more endpoints and the commissioning device in response to an affirmative determination that the randomized value is associated with the universally unique identifier.

6. The method according to claim 1, wherein the securely transmitting of the network-credential communication further comprises
   generating, via the server, one or more unique encryption keys based on both unique data of the one or more endpoints and a pre-shared master key included in the server;
   encrypting the network-credential communication based on a session key as encrypted network credentials; and
   transmitting, via the commissioning device, the encrypted network credentials to the one or more endpoints;
   recalculating, via the one or more endpoints, the session key; and
   decrypting, via the one or more endpoints, the encrypted network credentials received from the commissioning device.

7. The method according to claim 6, wherein the unique encryption key is the session key in the securely transmitting of the network-credential communication.

8. The method according to claim 6, wherein the securely transmitting of the network-credential communication further comprises deriving, via the server, a randomized session key based on the unique encryption key and randomized plaintext, wherein
the randomized session key is the session key.

9. The method according to claim 1, where the verifying of the integrity of the network-credential communication further comprises
calculating a first checksum for one or more secret data payloads, which include the user-input wireless network credentials;
combining the first checksum with the user-input wireless network credentials into the each of the one or more secret data payloads;
transmitting each of the one or more secret data payloads in the network-credential communication to the one or more endpoints, respectively;
independently calculating a second checksum via the one or more endpoints;
comparing the second checksum to the first checksum of the one or more secret data payloads;
confirming the integrity of the network-credential communication in response to an affirmative determination that the first checksum matches the second checksum; and
granting access to the one or more secret data payloads in response to the integrity of the network-credential communication being confirmed.

10. The method according to claim 1, wherein the verifying of the integrity of the network-credential communication further comprises
creating, via a server, one or more unique encryption keys based on a universally unique identifier of each of the one or more endpoints and a pre-shared master key included in the server;
creating a randomized session key based on the unique encryption key and randomized plain text;
encrypting the user-input wireless network credentials using the randomized session key as encrypted wireless credentials;
transferring the encrypted wireless credentials to the one or more endpoints attached to the one or more electronic devices unconnected to the wireless network;
independently calculating, via the one or more endpoints, a session key different from the randomized session key;
decrypting, via the one or more endpoints, the network-credential communication; and
calculating, via the one or more endpoints, a checksum;
comparing the checksum and the randomized plain text;
confirming the integrity of the network-credential communication in response to the checksum matching the randomized plain text; and
granting access to the wireless network credentials in response to the integrity of the network-credential communication being confirmed.

11. The method according to claim 10, wherein the creating of one or more unique encryption key further comprises
combining, via the server, the universally unique identifier of the one or more endpoints and the pre-shared master key located on the server to create each of the one or more unique encryption keys.

12. The method according to claim 10, wherein the creating of the randomized session key, the encrypting of the user-input wireless network credentials, and the transferring of the encrypted wireless credentials to the one or more endpoints occurs via the server.

13. The method according to claim 10, wherein the creating of the randomized session key, encrypting of the user-input wireless network credentials, and the transferring of the encrypted wireless credentials to the one or more endpoints occurs via the commissioning device.

14. The method according to claim 1, wherein the searching, via the commissioning device, for the at least one endpoint occurs over range-limited wireless communication.

15. The method according to claim 2, wherein
the one or more electronic devices are one or more split-type indoor units of an air conditioning apparatus, and
the one or more endpoint are wireless-network adapters that connect the split-type indoor units to the wireless work.

16. The method for provisioning multiple devices according to claim 1, wherein
the one or more endpoints are a plurality of endpoints, and
the accepting of the network credentials into the commissioning device occurs only once for a plurality of endpoints.

17. The method according to claim 1, wherein the verifying of the integrity of the network-credential communication confirms the authenticity of the network-credential communication.

18. A device provisioning system, comprising:
one or more endpoints unconnected to a wireless network configured to
verify the integrity and authenticity of a network-credential communication that includes user-input wireless-network credentials, and
access the wireless network based on the wireless network credentials in response to an affirmative verification of the network-credential communication; and
a commissioning device configured to
accept user-input network credentials of a wireless network,
search, via a wireless personal area network, for the one or more endpoints respectively attached to one or more electronic devices unconnected to the wireless network,
verify the ownership of the one or more endpoints to a server, and
securely transmit, via the wireless personal area network, a network-credential communication that includes the user-input wireless network credentials to the one or more endpoints in response to an affirmative verification of ownership.

19. The device provisioning system according to claim 18, wherein the one or more endpoint devices are attachable to one or more electronic devices, respectively, and provide wireless connectivity to the one or more electronic devices.

20. The device provisioning system according to claim 18, wherein the one or more electronic devices are one or more split-type indoor units of an air conditioning apparatus.

21. A method for provisioning multiple devices, comprising:
verifying, via a commissioning device, a co-location of one or more endpoints and the commissioning device to a server, the co-location being a predetermined spatial proximity between the one or more endpoints and the commissioning device;

generating, via the server, a unique encryption key based on universally unique identifiers of each of the one or more endpoints and a pre-shared master key included in the server;

securely transmitting, via the commissioning device, a network-credential communication from the commissioning device to the one or more endpoints in response to an affirmative verification of the co-location between the one or more endpoints and the commissioning device, the network-credential communication includes a user-input wireless network credentials and is based on the unique encryption key;

verifying, via the one or more endpoints, the integrity and authenticity of the network-credential communication; and accessing, via the one or more endpoints, the wireless network based on the wireless network credentials in response to an affirmative verification of the network-credential communication.

22. The method for provisioning multiple devices according to claim 6, wherein
the universally unique identifier includes all, or some of, a serial number of the one or more endpoints, and
the unique data in the generating of the unique encryption keys from the unique data and the pre-shared master key includes all, or some of, the serial number of the one or more endpoints.

23. The device provisioning system according to claim 18, wherein
the one or more endpoints are configured to send a universally unique identifier that includes all, or some of, a serial number of the one or more endpoints to the commissioning device, and
the commissioning device is configured to send to the one or more end points one or more unique encryption keys generated by the server based on the universally unique identifier of each of the one or more endpoints and a pre-shared master key included in the server.

24. The method for provisioning multiple devices according to claim 21, wherein
the universally unique identifier includes all, or some of, a serial number of the one or more endpoints.

* * * * *